"" US011544173B1

(12) United States Patent
Gabrovski

(10) Patent No.: US 11,544,173 B1
(45) Date of Patent: *Jan. 3, 2023

(54) DETECTING PERFORMANCE REGRESSIONS IN SOFTWARE FOR CONTROLLING AUTONOMOUS VEHICLES

(71) Applicant: Waymo LLC, Mountain View, CA (US)

(72) Inventor: Aleksandar Rumenov Gabrovski, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/120,834

(22) Filed: Dec. 14, 2020

Related U.S. Application Data

(63) Continuation of application No. 16/165,119, filed on Oct. 19, 2018, now Pat. No. 10,896,116.

(51) Int. Cl.
*G06F 11/36* (2006.01)
*G06F 9/445* (2018.01)
(Continued)

(52) U.S. Cl.
CPC ............ *G06F 11/3612* (2013.01); *G06F 8/71* (2013.01); *G06F 11/3616* (2013.01);
(Continued)

(58) Field of Classification Search
CPC ............. G06F 11/3612; G06F 11/3616; G06F 11/3664; G06F 11/261; G06F 11/263;
(Continued)

(56) References Cited

U.S. PATENT DOCUMENTS 5,548,785 A 8/1996 Fogg et al.
5,787,269 A 7/1998 Hyodo
(Continued)

OTHER PUBLICATIONS

Xunsheng Du et al., Stacked LSTM Deep Learning Model for Traffic Prediction in Vehicle-to-Vehicle Communication, IEEE 2017, [Retrieved on Jan. 12, 2022]. Retrieved from the internet: <URL: https://ieeexplore.ieee.org/stamp/stamp.jsp?tp=&arnumber=8288312> 5 Pages (1-5) (Year: 2017).*

(Continued)

*Primary Examiner* — Anibal Rivera
(74) *Attorney, Agent, or Firm* — Botos Churchill IP Law

(57) ABSTRACT

The disclosure relate to detecting performance regressions in software used to control autonomous vehicles. For instance, a simulation may be run using a first version of the software. While the simulation is running, CPU and memory usage by one or more functions of the first version of the software may be sampled. The sampled CPU and memory usage may be compared to CPU or memory usage by each of the one or more functions in a plurality of simulations each running a corresponding second version of the software. Based on the comparisons, an anomaly corresponding to a performance regression in the first version of the software relating to one of the one or more functions may be identified. In response to detecting the anomaly, the first version of the software and the one of the one or more functions may be flagged for review.

20 Claims, 6 Drawing Sheets

(51) Int. Cl.
*G06F 8/71* (2018.01)
*G06F 11/34* (2006.01)
*G06F 11/26* (2006.01)
*G06F 9/48* (2006.01)
*G06F 11/263* (2006.01)

(52) U.S. Cl.
CPC ........ *G06F 11/3664* (2013.01); *G06F 9/4843* (2013.01); *G06F 11/261* (2013.01); *G06F 11/263* (2013.01); *G06F 11/3409* (2013.01); *G06F 11/3433* (2013.01); *G06F 11/3452* (2013.01); *G06F 11/3466* (2013.01); *G06F 11/3604* (2013.01); *G06F 11/3608* (2013.01); *G06F 11/3676* (2013.01); *G06F 11/3688* (2013.01); *G06F 11/3692* (2013.01)

(58) Field of Classification Search
CPC ............. G06F 11/3409; G06F 11/3433; G06F 11/3688; G06F 9/4843; G06F 8/71; G06F 30/15; G06F 11/3692; G06F 11/0739; G06F 11/302; G06F 11/3051; G06F 11/3452; G06F 11/3466; G06F 11/3604; G06F 11/3608; G06F 11/3676; G06F 9/455; G06F 9/505; G05D 2201/0213; G05D 2201/0212
See application file for complete search history.

(56) References Cited

U.S. PATENT DOCUMENTS

| | | | |
|---|---|---|---|
| 6,477,683 B1 | 11/2002 | Killian et al. | |
| 7,103,460 B1 | 9/2006 | Breed | |
| 7,441,236 B2 | 10/2008 | Chon et al. | |
| 7,539,893 B1 | 5/2009 | Ferguson | |
| 7,840,944 B2 | 11/2010 | Brunswig et al. | |
| 7,937,689 B2 | 5/2011 | Holden | |
| 8,265,916 B1 | 9/2012 | Portal et al. | |
| 8,326,970 B2 | 12/2012 | Cherkasova et al. | |
| 9,292,822 B2 | 3/2016 | Hankins et al. | |
| 9,805,601 B1 * | 10/2017 | Fields | G08G 1/096844 |
| 10,212,058 B2 | 2/2019 | Aly Salama et al. | |
| 10,311,654 B2 | 6/2019 | Komada | |
| 10,339,731 B2 | 7/2019 | Kumabe | |
| 2004/0036601 A1 | 2/2004 | Obradovich | |
| 2005/0187750 A1 | 8/2005 | Satoh et al. | |
| 2006/0140249 A1 | 6/2006 | Kohno | |
| 2007/0282587 A1 | 12/2007 | Sato et al. | |
| 2009/0006066 A1 | 1/2009 | Behm et al. | |
| 2009/0307468 A1 | 12/2009 | Choudhury et al. | |
| 2009/0319240 A1 | 12/2009 | Inada | |
| 2010/0030546 A1 | 2/2010 | Dong et al. | |
| 2011/0160964 A1 | 6/2011 | Obradovich | |
| 2013/0090900 A1 | 4/2013 | Gering | |
| 2013/0117765 A1 | 5/2013 | Suzuki et al. | |
| 2013/0346010 A1 * | 12/2013 | Schulz | B60L 3/0069 702/122 |
| 2014/0180961 A1 | 6/2014 | Hankins et al. | |
| 2014/0379901 A1 | 12/2014 | Tseitlin et al. | |
| 2015/0158495 A1 | 6/2015 | Duncan et al. | |
| 2015/0161893 A1 | 6/2015 | Duncan et al. | |
| 2015/0161894 A1 | 6/2015 | Duncan et al. | |
| 2015/0269790 A1 * | 9/2015 | Batcheller | G08G 1/20 701/537 |
| 2015/0339207 A1 | 11/2015 | Hod | |
| 2016/0005333 A1 | 1/2016 | Naouri | |
| 2016/0154455 A1 | 6/2016 | Kawabe | |
| 2016/0364922 A1 | 12/2016 | Sahinoglu et al. | |
| 2016/0366598 A1 | 12/2016 | Gallagher | |
| 2017/0124781 A1 | 5/2017 | Douillard et al. | |
| 2017/0132118 A1 | 5/2017 | Stefan et al. | |
| 2017/0197643 A1 | 7/2017 | Gariepy et al. | |
| 2017/0263120 A1 | 9/2017 | Durie et al. | |
| 2017/0310566 A1 | 10/2017 | Aly Salama et al. | |
| 2018/0060456 A1 | 3/2018 | Phatak et al. | |
| 2018/0060469 A1 | 3/2018 | Morgan et al. | |
| 2018/0075538 A1 | 3/2018 | Konrardy et al. | |
| 2018/0121322 A1 | 5/2018 | Reyes et al. | |
| 2018/0148068 A1 | 5/2018 | Dai et al. | |
| 2018/0322385 A1 | 11/2018 | Yehezkel Rohekar et al. | |
| 2018/0335785 A1 | 11/2018 | Miller et al. | |
| 2018/0341261 A1 | 11/2018 | Kislovskiy et al. | |
| 2018/0341571 A1 | 11/2018 | Kislovskiy et al. | |
| 2018/0341880 A1 | 11/2018 | Kislovskiy et al. | |
| 2018/0341887 A1 | 11/2018 | Kislovskiy et al. | |
| 2018/0349508 A1 | 12/2018 | Bequet et al. | |
| 2019/0009790 A1 | 1/2019 | Michalakis et al. | |
| 2019/0031201 A1 | 1/2019 | Lundsgaard | |
| 2019/0048809 A1 | 2/2019 | Fox et al. | |
| 2019/0049968 A1 | 2/2019 | Dean et al. | |
| 2019/0050515 A1 | 2/2019 | Su et al. | |
| 2019/0074229 A1 | 3/2019 | Lukas et al. | |
| 2019/0102361 A1 | 4/2019 | Muralidharan et al. | |
| 2019/0108453 A1 | 4/2019 | Schwabe | |
| 2019/0145860 A1 | 5/2019 | Phillips et al. | |
| 2019/0155291 A1 | 5/2019 | Heit et al. | |
| 2019/0164007 A1 * | 5/2019 | Liu | G06V 20/13 |
| 2019/0213103 A1 | 7/2019 | Morley et al. | |
| 2019/0266418 A1 | 8/2019 | Xu et al. | |
| 2019/0303759 A1 | 10/2019 | Farabet et al. | |
| 2019/0367040 A1 | 12/2019 | Kameda et al. | |
| 2019/0370420 A1 | 12/2019 | Feng et al. | |
| 2019/0379683 A1 | 12/2019 | Overby et al. | |
| 2019/0384303 A1 | 12/2019 | Muller et al. | |
| 2019/0384304 A1 | 12/2019 | Towal et al. | |
| 2020/0026960 A1 | 1/2020 | Park et al. | |
| 2020/0049835 A1 | 2/2020 | Browning | |
| 2020/0183387 A1 | 6/2020 | Heit et al. | |

OTHER PUBLICATIONS

Vijay Govindarajan et al., Human Modeling for Autonomous Vehicles, Dec. 15, 2017, [Retrieved on Aug. 23, 2022]. Retrieved from the internet: <URL: https://digitalassets.lib.berkeley.edu/techreports/ucb/text/EECS-2017-226.pdf> 39 Pages (1427-1434) (Year: 2017).*

GitHub—google/pprof: pprof is a tool for visualization and analysis of profiling data, https://github.com/google/pprof, retrieved from the internet on Jan. 23, 2020, pp. 1-3.

Gperftools CPU Profiler, https://gperftools.github.io/gperftools/cpuprofile.html, retrieved from internet on Jan. 23, 2020, pp. 1-8.

"Analyze Runtime Performance", Available at: <https://developers.google.com/web/tools/chrome-devtools/rendering-tools/>, retrieved on Aug. 28, 2018, 10 pages.

"CPU Profiler", Available at: <http://goog-perftools.sourceforge.net/doc/cpu_profiler.html>, retrieved on Aug. 28, 2018, 7 pages.

Shang, Weiyi, et al., "Automated Detection of Performance Regressions Using Regression Model on Clustered Performance", 2015, [Retrieved on Aug. 27, 2020]. Retrieved from the internet: <URL: https://dl.acm.org/doi/pdf/10.1145/2668930.2688052> 12 Pages (15-26) (Year: 2015).

Zhu, Wentao, et al., "Vehicle detection in driving simulation using extreme learning machine", Oct. 2013, [Retrieved on Aug. 27, 2020]. Retrieved from the internet: <URL: https://pdf.sciencedirectassets.com/271597/1-s2.0-S0925231214X00020/1-s2.0-S0925231213010126/main.pdf?> 6 Pages (160-165) (Year: 2013).

* cited by examiner

DETECTING PERFORMANCE REGRESSIONS IN SOFTWARE FOR CONTROLLING AUTONOMOUS VEHICLES

CROSS REFERENCE TO RELATED APPLICATIONS

The present application is a continuation of U.S. patent application Ser. No. 16/165,119, filed Oct. 19, 2018, now U.S. Pat. No. 10,896,116, issued Jan. 19, 2021, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. It is critical that the autonomous control software used by these vehicles to operate in the autonomous mode is tested and validated before such software is actually used to control the vehicles in areas where the vehicles are interacting with other objects.

BRIEF SUMMARY

One aspect of the disclosure provides a method of detecting performance regressions in software used to control autonomous vehicles. The method includes running a simulation using a first version of the software; while the simulation is running, sampling CPU time for one or more functions of the first version of software; comparing the sampled CPU time by each of the one or more functions during the simulation to CPU time by each of the one or more functions in a plurality of simulations each running a corresponding second version of the software; based on the comparison, detecting an anomaly corresponding to a performance regression in the first version of the software relating to one of the one or more functions; and in response to detecting the anomaly, flagging the first version of the software and the one of the one or more functions for review.

In one example, the simulation is a log-based simulation generated from data collected by a vehicle operating in an autonomous driving mode. In this example, the method also includes selecting the simulation based on information in the data indicating that a computing device of the vehicle ran out of CPU. Alternatively, the method also includes selecting the simulation based on information in the data indicating that a computing device of the vehicle ran out of memory. As a further alternatively, the method also includes selecting the simulation based on information in the data indicating that a computing device of the vehicle ran out of processing time. In another example, the method also includes determining an amount of time each of the one or more functions was active at the CPU during the first version of the simulation based on the sampled CPU time for each of the one or more functions during the simulation, and the comparing is further based on the amount of time. In another example, the method also includes determining a distribution of CPU time for each of the one or more functions over the plurality of simulations, and wherein the comparing is further based on the distribution. In this example, the method also includes determining an amount of time each of the one or more functions was active at the CPU during the simulation based on the sampled CPU time by each of the one or more functions during the simulation, and the comparing includes comparing the amount of time to the distribution. In this example, the method also includes determining a standard deviation value for the distribution, and the comparing is further based on the standard deviation value. In this example, the method also includes determining a threshold value based on the standard deviation value, and the comparison is further based on the threshold value.

In another example, the method also includes aggregating the sampled CPU time for one or more functions of the first version of the software among a parent function and any child functions for that parent function, and wherein the comparing is further based on the aggregated sampled CPU usage. In another example, the method also includes, before flagging the software and the one of the one or more functions for review, determining that the anomaly has been detected in a predetermined number of runs of the simulation using the first version of the software. In another example, the first version of the simulation includes a change made to one of the corresponding second versions of the simulation. In this example, the change relates to a particular type of driving situation, and the method also includes selecting the simulation from log data generated by one or more vehicles operating in an autonomous driving mode based on the particular type of driving situation. Alternatively, the change relates to a particular type of driving situation, and the method also includes generating the simulation based on the particular type of driving situation. In another example, the method also includes, while the simulation is running, sampling memory allocation by one or more functions of the first version of software; comparing the sampled memory allocation by each of the one or more functions during the simulation to memory allocations by each of the one or more functions in a plurality of simulations each running a corresponding second version of the software; based on the comparison, detecting a second anomaly corresponding to a performance regression in the first version of the software relating to a second one of the one or more functions; and in response to identifying the second anomaly, flagging the first version of the software and the one of the one or more functions for review. In this example, the method also includes determining a distribution of memory allocation for each of the one or more functions over the plurality of simulations, and wherein the comparing is further based on the distribution. In this example, the method also includes determining a standard deviation value for the distribution, and wherein the comparing is further based on the standard deviation value. In this example, the method also includes determining a threshold value based on the standard deviation value, wherein the comparison is further based on the threshold value. In another example, the method also includes, aggregating the sampled memory allocation by one or more functions of the first version of the software among a parent function and any child functions for that parent function, and wherein the comparing is further based on the aggregated sampled memory allocation.

DETAILED DESCRIPTION

Overview

The technology relates to detecting performance regressions which may be caused when a change is made to software used to control an autonomous vehicle. For instance, some changes may cause inadvertent drains on the system. To detect the functions that are causing such drains, simulations are run to test the software's behavior in "real world situations". During each simulation the CPU and memory usage of each function may be tracked. The CPU and memory usage for different versions of the software (pre and post change) may be compared to determine if there are any anomalies. These may then be flagged for review or further analysis.

The simulations may be "log-based" simulations that are run using log data collected by a vehicle operating in an autonomous mode over some period of time. During the simulation, the various functions of the software may be called and require some percentage of memory.

The CPU time for these functions may be tracked by sampling what the CPU is doing several times per second. Overtime, the sampling may be used to determine how much time each of the functions was active at the CPU. The result may be a probabilistic estimate of overall CPU time.

Similarly, the memory (RAM) usage of these functions may be tracked using the aforementioned sampling. In addition to identifying which functions were requiring memory, the sampling may also identify the percentage of that memory was allocated to that function. The result may be a probabilistic estimate of overall memory usage.

The CPU time and memory usage for a function may be collected over the course of several simulations running different versions of software. The CPU time and memory usage for various functions for the latest version of the software may then be compared to this distribution in order to detect performance regressions or anomalies. Once an anomaly is detected, the software and the function which caused the anomaly may be flagged for further review.

Because the software is to be used to control autonomous vehicles, it is imperative that the simulation is run in ways that are most likely to mimic computing conditions of an actual vehicle. In that regard, the architecture of the computing devices that are running the simulations may be configured to be as similar as possible to that of a real vehicle. This may also involve adjusting some of the scheduling for the simulations.

The features described herein may allow for the detection of performance regressions each time a change is made to autonomous vehicle software. Because only CPU and memory usage are tracked for the simulations, other types of processing slowdowns, which may be unrelated to what would occur if the software was being used on a vehicle, can be ignored. In this regard, wait times for data reading, retrieving and writing for specific functions are ignored and the identification of anomalies, as discussed herein, is more reliable.

Example Systems

Figure 1:
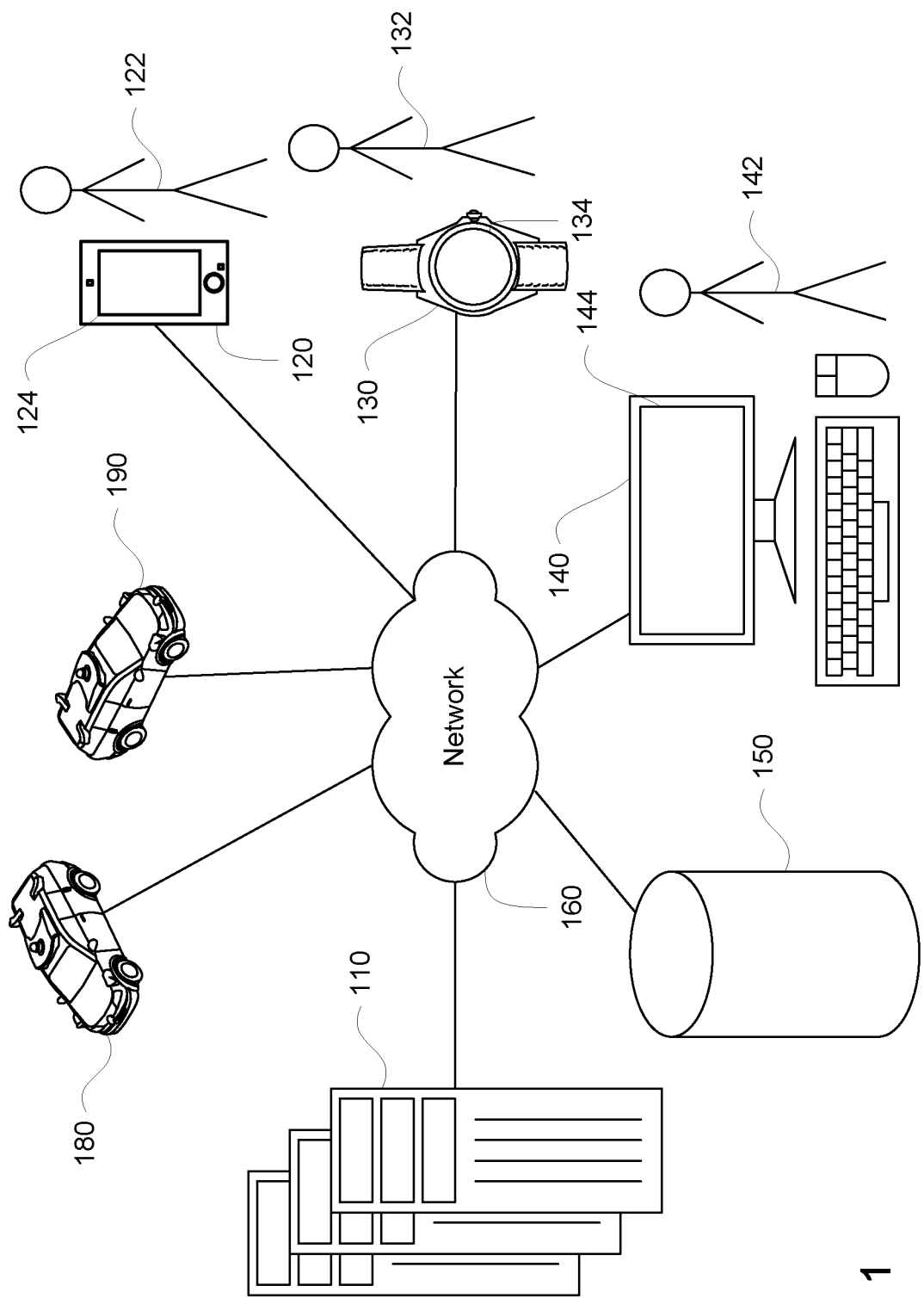
FIG. 1 is a pictorial diagram of an example system in accordance with aspects of the disclosure.
Figure 2:
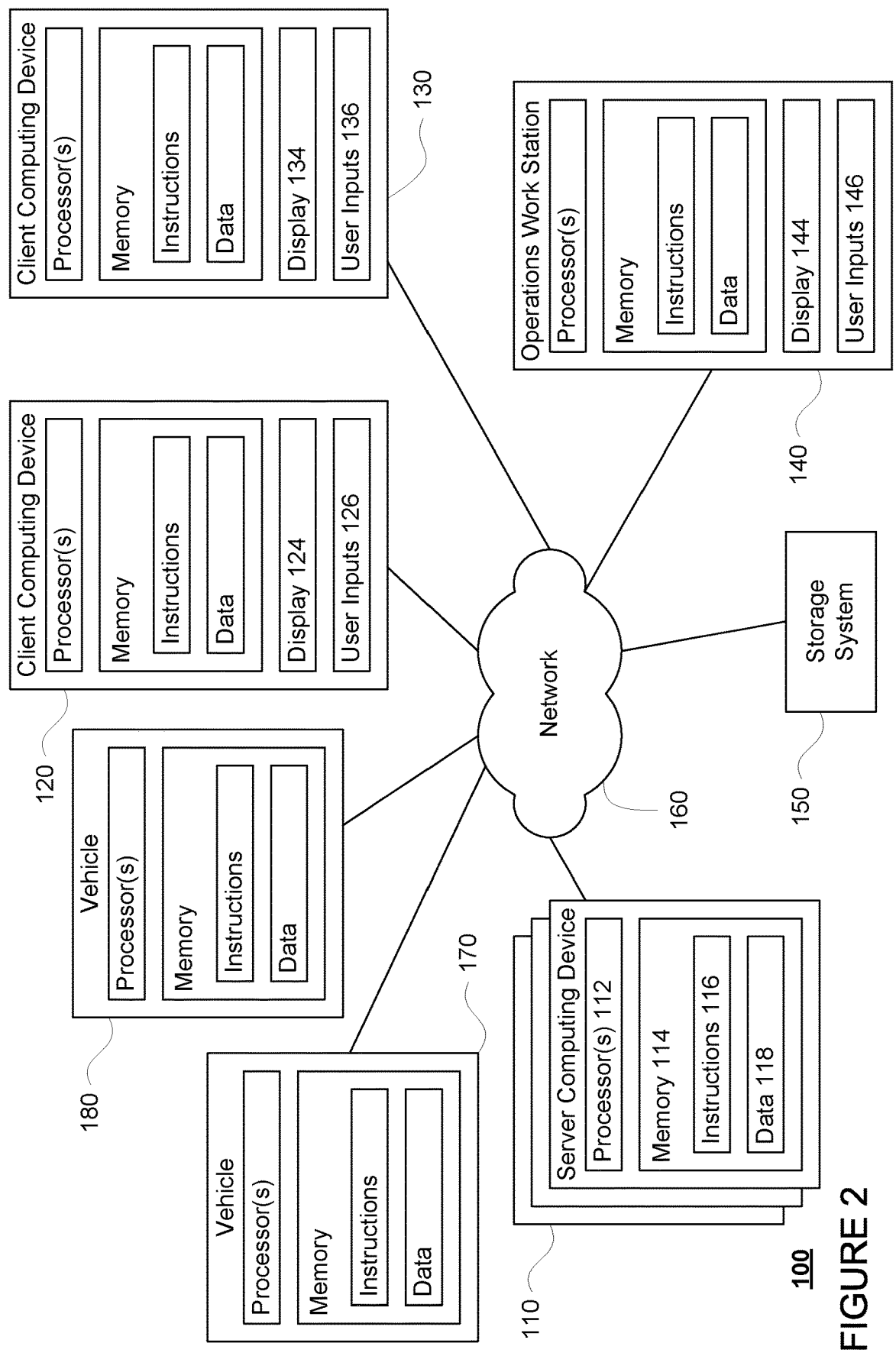
FIG. 2 is a functional diagram of the system of FIG. 1 in accordance with aspects of the disclosure.

FIGS. 1 and 2 are pictorial and functional diagrams, respectively, of an example system 100 that includes a plurality of computing devices 110, 120, 130, 140, a storage system 150, and autonomous vehicles 170, 180 connected via a network 160. Although only a few vehicles and computing devices are depicted for simplicity, a typical system may include significantly more.

Computing devices 110 may include one or more processors 112 and memory 114. The memory 114 stores information accessible by the one or more processors 112, including instructions 116 and data 118 that may be executed or otherwise used by the one or more processors 112. The memory 114 may be of any type capable of storing information accessible by the processor, including a computing device-readable medium, or other medium that stores data that may be read with the aid of an electronic device, such as a hard- drive, memory card, ROM, RAM, DVD or other optical disks, as well as other write-capable and read-only memories. Systems and methods may include different combinations of the foregoing, whereby different portions of the instructions and data are stored on different types of media.

The instructions 116 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 118 may be retrieved, stored or modified by processor 112 in accordance with the instructions 116. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

As shown in FIG. 1, each of computing devices 110, 120, 130, 140 and vehicles 180, 190 may include one or more processors, memory, data and instructions. Such processors, memories, data and instructions may be configured similarly to one or more processors 112, memory 114, and instructions 116, and data 118 of computing device 110.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 110 may include one or more server computing devices that are capable of communicating with computing devices of vehicles 170, 180 and/or computing devices 120, 130, 140 via the network 160.

For example, vehicles 170, 180, may be a part of a fleet of autonomous vehicles that can be dispatched by server computing devices to various locations. In this regard, the server computing devices 110 may function as a validation computing system which can be used to validate autonomous control software which vehicles such as vehicle 100 and vehicle 100A may use to operate in an autonomous driving mode. In addition, server computing devices 110 may use network 160 to transmit and present information to a user, such as user 122, 132, 142 on a display, such as displays 124, 134, 144 of computing devices 120, 130, 140. In this regard, computing devices 120, 130, 140 may be considered client computing devices.

As shown in FIG. 1, each client computing device 120, 130, 140 may be a personal computing device intended for use by a user 122, 132, 142, and have all of the components normally used in connection with a personal computing device including a one or more processors (e.g., a central processing unit (CPU)), memory (e.g., RAM and internal hard drives) storing data and instructions, a display such as displays 124, 134, 144 (e.g., a monitor having a screen, a touch-screen, a projector, a television, or other device that is operable to display information), and user input devices 126, 136, 146 (e.g., a mouse, keyboard, touchscreen or microphone). The client computing devices may also include a camera for recording video streams, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a wristwatch as shown in FIG. 1. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIGS. 1 and 2, and/or may be directly connected to or incorporated into any of the computing devices 110, 120, 130, 140, etc.

Storage system 150 may store various types of information as described in more detail below. This information may be retrieved or otherwise accessed by a server computing device, such as one or more server computing devices 110, in order to perform some or all of the features described herein. For instance, storage system 150 may store log data. This log data may include, for instance, sensor data generated by a perception system, such as a perception system of vehicle 170 or 180. The perception system may include a plurality of sensors that generate sensor data. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle 170 or 180, actual locations of the vehicles at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation.

In addition, the storage system 150 may also store autonomous control software which is to be used by vehicles, such as vehicle 100, to operate a vehicle in an autonomous driving mode. This autonomous control software stored in the storage system 150 may be a version which has not yet been validated. Once validated, the autonomous control software may be sent, for instance, to memory 114 of vehicle 100 in order to be used by computing devices of vehicles 180, 190 in order to control vehicles 180, 190 in an autonomous driving mode.

As discussed further below, the storage system 150 may also store CPU times and memory usage for various functions of the software. This information may include, among other things, distributions, standard deviations as well as flagged software versions and/or functions as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to test and/or validate the autonomous control software which will be stored in memory 114 for use by the computing devices of vehicle 170, 180, the server computing devices 110 may run various simulations. These simulations may be log based simulations that are generated from the information stored in the aforementioned log data of storage system 150. In this regard, the server computing devices 110 may access the storage system 150 in order to retrieve the log data and run a simulation. For instance, a portion of the log data corresponding to a minute in real time of an autonomous vehicle that generated the log data may be retrieved from the storage system. This portion of log data may be "hand" selected by human operators and/or computing devices based on the types of events recorded in the logs or more randomly, for instance, by selecting 1% or more or less of all autonomous driving logs.

The retrieved portion of log data may be used to run an initial simulation. When running the autonomous control software through the portion of log data, the details (sensor data and events) of the log data may be used to generate a simulation. In other words, the sensor data of the portion of log data may simply be "played" as input to the perception system of a simulated vehicle controlled by the autonomous control software. In this regard, the autonomous control software "experiences" or processes the log data as if the autonomous control software was actually being run on vehicle 170 or 180. In other words, the simulation may include data defining characteristics of objects such as shape, location, orientation, speed, etc. of objects such as vehicles, pedestrians, bicyclists, vegetation, curbs, lane lines, sidewalks, crosswalks, buildings, etc. defined by the sensor data of the log data. Further, the simulation may include characteristics for a virtual vehicle, corresponding to vehicle 170 or 180, including the virtual vehicle's shape, location, orientation, speed, etc. defined by the events of the log data.

During the simulation, the various functions of the software may be called. These functions may require some percentage of memory in order to perform the particular procedure or routine of that function. At least some of these functions may be arranged in a tree or hierarchy such that during use, some "parent" functions will also require one or more other "child" functions to be called. These parent and child functions may thus be considered a single hierarchical function.

The CPU times for these functions may be tracked by one of the one or more server computing device 110 by sampling what the CPU is doing several times per second. In this regard, the CPU time may represent how much time a given function was active at the CPU or the one or more processors of one of the server computing devices of the server computing devices 110. Each sample may result in a list of one or more functions. Overtime, the sampling may be used to determine how much time each of the functions was active at the CPU. The result may be a probabilistic estimate of overall CPU time. In some examples, the CPU time for a hierarchical function may include the collective time for the parent function and any child functions for that hierarchical function.

Similarly, the memory (RAM) usage of these functions may be tracked by one of the one or more server computing device 110 using the aforementioned sampling. In this regard, the memory usage for a given function may represent how much of the RAM of the memory 114 of a given server computing device of the server computing devices 110 was allocated to the given function. In addition to identifying which functions were requiring memory, the sampling may also identify the percentage of that memory was allocated to that function. The result is a probabilistic estimate of overall memory usage. Again, the memory allocation for a hierarchical function may include the collective time for the parent function and any child functions for that hierarchical function.

The CPU and memory usage for various functions used by the software may be collected by one of the one or more server computing device 110 over the course of several simulations running different versions of software. This data may be aggregated, for instance, by determining the distribution (or, for instance, the average) and standard deviations and stored, for instance, in the storage system 150.

The CPU and memory usage for various functions for the latest version of the software may then be compared by one of the one or more server computing device 110 to the respective distributions in order to detect performance regressions or anomalies. For instance, this may involve using change port detection algorithms or anomaly detection algorithms to determining a number of standard deviations between the CPU time for a given function and the distribution for the CPU time for that given function. If the number of standard deviations is greater than or equal to a threshold value this may indicate a performance regression. As an example, the average number of standard deviations between different simulations is around 3 standard deviations, the threshold value may be 5 or 6 standard deviations. Of course, the lower the threshold value (the smaller the number of standard deviations), the more likely the threshold will be met. Similarly, a number of standard deviations between the memory usage for the given function and the distribution for the memory usage for that given function may be determined. Again, if the number of standard deviations is greater than or equal to a threshold value this may indicate an anomaly. However, if a difference between the CPU time or memory usage is an increase as compared to the distribution, this may indicate an anomaly corresponding to a decrease in efficiency of the software. As such, if a difference between the CPU time or memory usage is a decrease as compared to the distribution, this may indicate an anomaly corresponding to an increase in the efficiency of the software. In that regard, the server computing devices 110 are able to detect performance regressions as well as improvements.

Because the overall CPU and memory usage for a function will be probabilistic, the results of a simulation may end up being slightly different even where the same simulation is run with the same software. In other words, the results may tend to be somewhat noisy. Another very large source of noise is the fact that the simulations are run in the "cloud" and may not have full machine isolation. For example, other processes may be allowed to run in parallel on the same machine as the simulations (though not on the same CPU) which may greatly affects the noise observed in the CPU profiles. As such, when analyzing the results to identify anomalies, only significant changes, increases or decreases, such as on the order of 5 or 6 standard deviations as noted above, may be relevant. Of course, this can be adjusted by tuning, for instance increasing or decreasing, the threshold value. In addition, the threshold values for CPU time and for memory usage may be the same or different.

Figure 3:
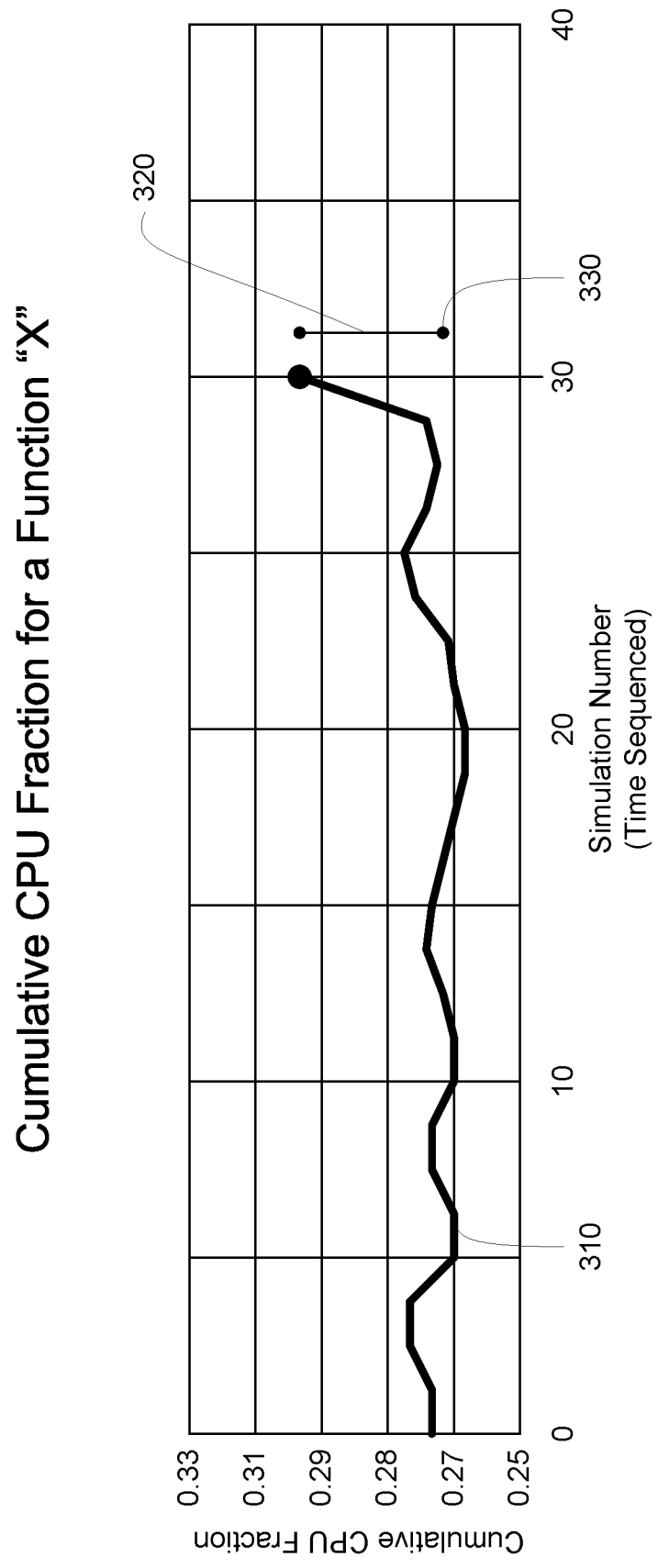
FIG. 3 is an example graphical representation in accordance with aspects of the disclosure.

FIG. 3 provides an example graphical representation of the distribution 310 of the cumulative CPU time fraction for a function "X" over 30 different versions of the software. In this example, the different versions are compared sequentially such that each new version represents some change from a prior version. Function X may represent any function used by the software and is identified only for explanation purposes. The thirtieth version of the simulation shows a rather large increase in CPU time fraction as compared to the distribution 310. This increase is represented by line 320. In this regard, a lower edge 330 of the line 320 may represent an average of the CPU time of function X for the prior versions. If this increase is greater than or equal to the threshold value for the CPU time, an anomaly may be detected in the thirtieth version and/or the function X.

Once an anomaly is detected, the software and the function which caused the anomaly may be flagged for further review. In this regard, referring to the example of FIG. 3, the thirtieth version and/or the function X may be flagged for further review. This may include, for instance, sending a message, such as an email, to an engineer to further analyze the software and prior changes made to the software.

Figure 4:
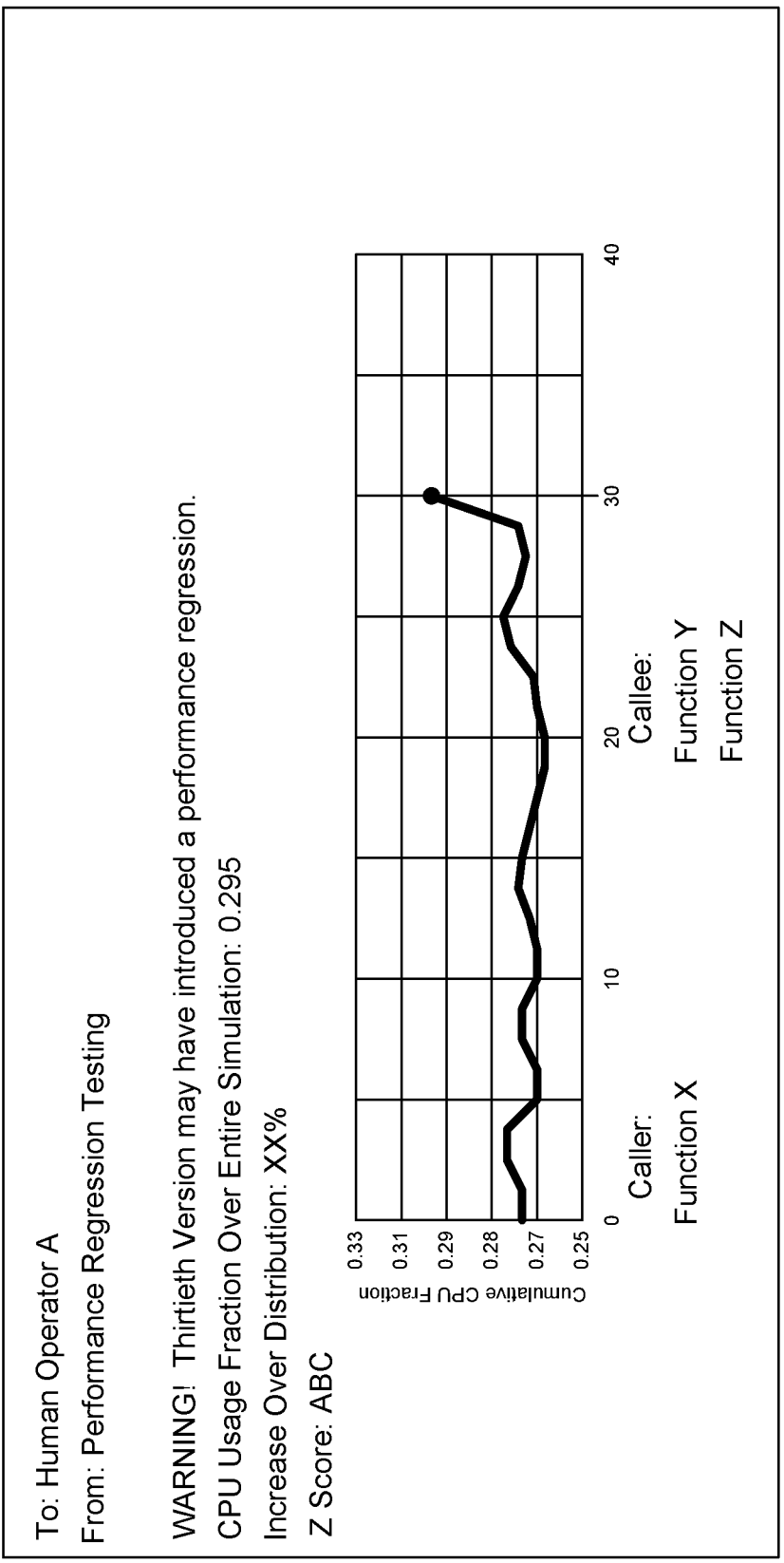
FIG. 4 is an example email in accordance with aspects of the disclosure.

For instance, FIG. 4 provides an example email 400 meant to be reviewed by a human operator, such as user 142 of client computing device 140. As shown example email 400 includes information identifying the software version (here, the thirtieth version), the function (here, function X), as well as other information such as the distribution (here, the graphical representation 300 and/or actual data points), the CPU time fraction over the entire simulation (here, 0.295), the increase over the distribution (here, represented by value "XX" percent), and a z score (here, represented by value "ABC"). The z score may represent the number of standard deviations away from the mean of the distribution. In addition, in this example, the function X may be a hierarchical function, an example email may also identify the parent (caller) and child (callee) functions for that hierarchical function. Although not shown, an email or message may also include such information for other functions which may have been flagged for a given simulation as causing a detected anomaly. Further, although the example of FIG. 4 relates to CPU time, similar information may be provided for functions flagged as causing a detected anomaly for memory usage.

Because the software is to be used to control autonomous vehicles, it may be useful to have the simulations run in ways that are most likely to mimic computing conditions of an actual vehicle. In that regard, the architecture of the computing devices that are running the simulations may be configured to be as similar as possible to that of a real vehicle. This may also involve adjusting some of the scheduling for the simulations. For instance, the simulations may be in the "cloud" where generally the same machine might be running several tasks from different users, such as users 122, 132, 142, at the same time. In other words, the machine may also be running other processes that have nothing to do with running simulations using autonomous vehicle software. This may be problematic since it may cause memory fragmentation (all processes shared the same physical RAM and so allocations may end up being fragmented across a large range) and CPU cache flushing (CPUs cache the memory they need to access over time. However, if other processes are scheduling at the same time on these CPUs, the CPU caches will be flushed. This will show up in any profiling, since the CPU will run slower than when everything is cached correctly).

An additional concern may be input and output latency. In other words, reading and writing to log files over the network 160 may cause delays. For instance, network 160 may be generally considered fast, but for some percentage of the time, such as 1% or more or less, the network may simply be very slow. During that 1% of the time all CPU profiles of the server computing devices 110 will be affected, since the CPU sampling may indicate that the software is spending a lot more time in functions that deal with input and output than usual. This input and output concern may be addressed by ensuring a fast network connection at high latencies for the simulations, which greatly mitigates this concern, though may not eliminate it completely.

Memory fragmentation and CPU cache concerns may be by scheduling exclusive machines for the simulations in the cloud such that the only processes that can run on any of the server computing devices 110 are the simulations and nothing else. However, in some instances this may not always be feasible, and as such, exclusive CPU scheduling, meaning no other process on the machine may share the same CPU as the simulation, may be employed. In addition, specific threading limits and CPU architectures may be required for running the simulations. This may address some of the CPU cache concerns, but issues due to memory fragmentation may still be present. In addition, in order to reduce the likelihood of flagging software and functions for an anomaly that may be due to the system architecture of the computing devices running the simulation, before an anomaly is flagged for later review, the simulation may be run multiple times, such as 3 times or more or less. As such, if the anomaly is identified for each of these other simulations, the software and function may be flagged.

In addition, in order to further increase the likelihood of identifying anomalies, the simulations may generated (either from "scratch" or by injecting additional objects, such as other vehicles, etc., into a log-based simulation) or selected (if completely log-based simulation) in order to specifically tax the CPU and memory usage requirements of the software. In other words, simulations may be generated or selected in order to be computationally difficult for the software. For instance, log data corresponding to times when a vehicle previously ran out of CPU, memory, processing time, etc. may be selected. As another instance, if a software change is specific to a particular type of situations (e.g. performing right turns on red lights), the simulations may be generated or selected that include the software performing such tasks. As yet another instance, simulations may be generated or selected that include situations which typically require a lot of processing power, such as when it is raining or when the vehicle is driving in a busy parking lot.

Figure 5:
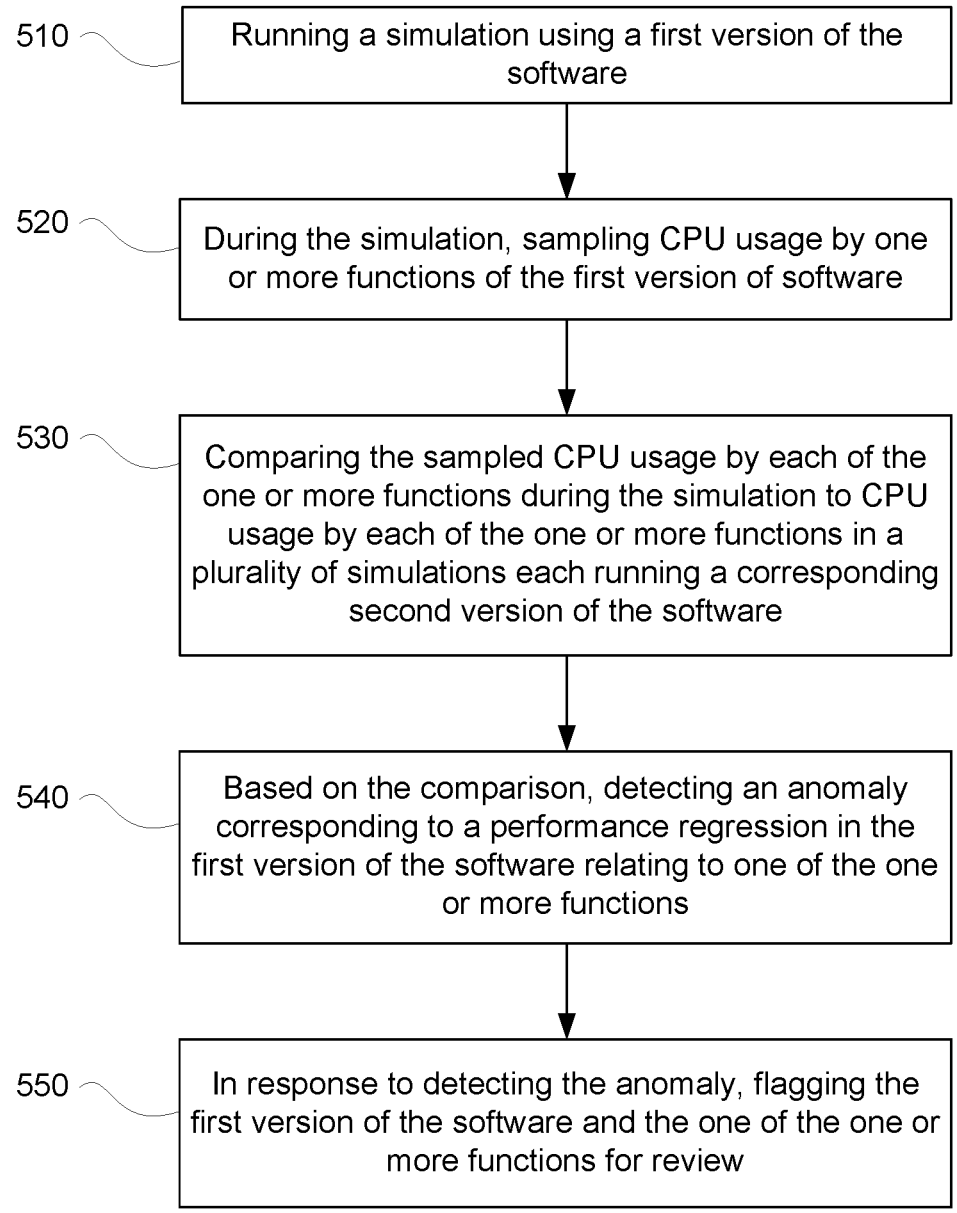
FIG. 5 is an example flow diagram in accordance with aspects of the disclosure.

FIG. 5 includes an example flow diagram 500 of some of the examples for detecting performance regressions in software used to control autonomous vehicles, which may be performed by one or more processors such as processors of computing devices 110. As shown in block 510, a simulation is run using a first version of the software. At block 520, while the simulation is running, CPU time for one or more functions of the first version of software is sampled. At block 530, the sampled CPU time by each of the one or more functions during the simulation is compared to CPU time by each of the one or more functions in a plurality of simulations each running a corresponding second version of the software. At block 540, based on the comparison, an anomaly corresponding to a performance regression in the first version of the software relating to one of the one or more functions is detected. At block 550, in response to detecting the anomaly, the first version of the software and the one of the one or more functions is flagged for review.

Figure 6:
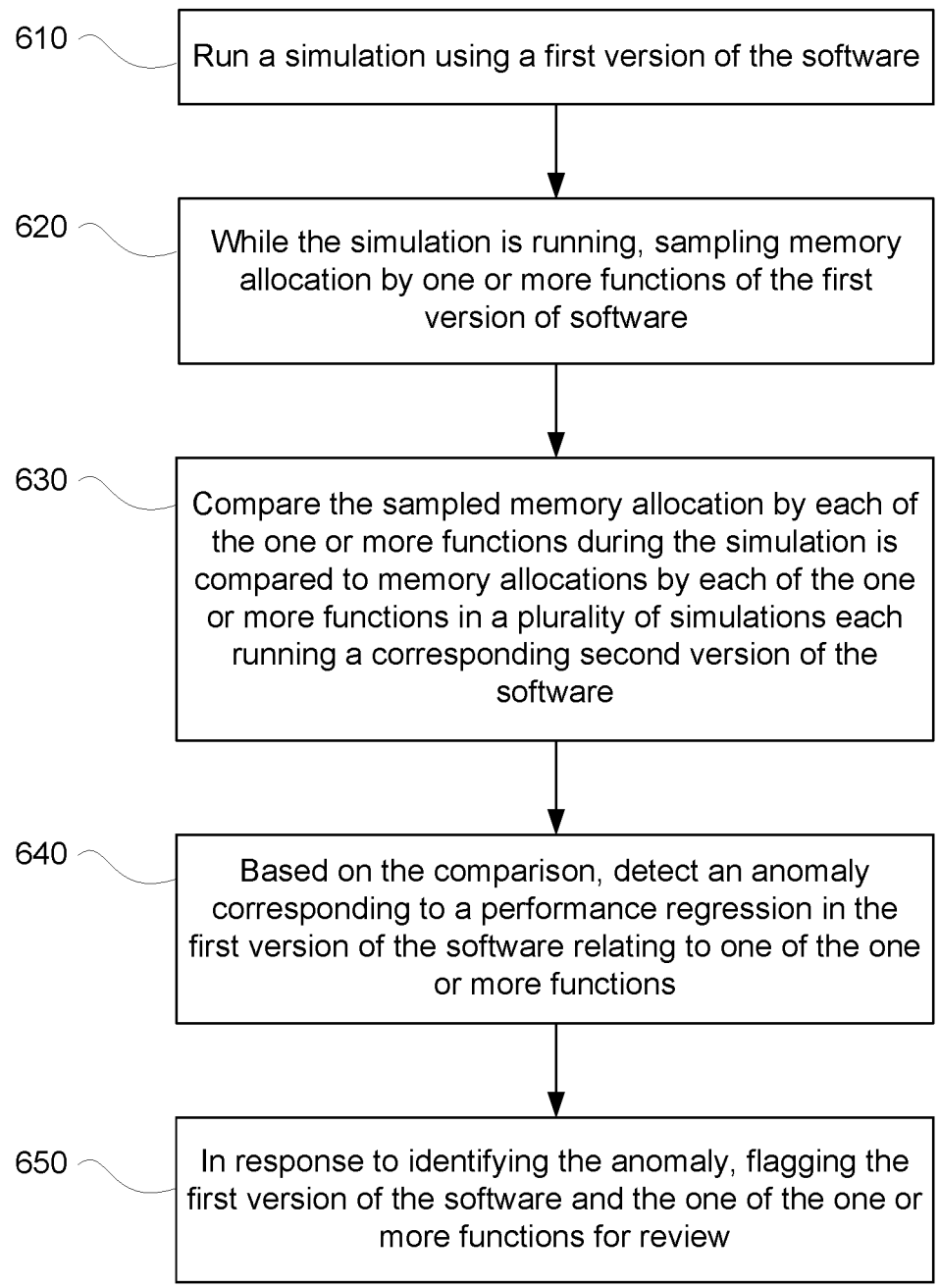
FIG. 6 is an example flow diagram in accordance with aspects of the disclosure.

FIG. 6 includes an example flow diagram 600 of some of the examples for detecting performance regressions in software used to control autonomous vehicles, which may be performed by one or more processors such as processors of computing devices 110. As shown in block 610, a simulation is run using a first version of the software. At block 620, while the simulation is running, memory allocation by one or more functions of the first version of software is sampled. At block 630, the sampled memory allocation by each of the one or more functions during the simulation is compared to memory allocations by each of the one or more functions in a plurality of simulations each running a corresponding second version of the software. At block 640, based on the comparison, an anomaly corresponding to a performance regression in the first version of the software relating to one of the one or more functions is detected. At block 650, in response to identifying the anomaly, the first version of the software and the one of the one or more functions are flagged for review. Although FIGS. 5 and 6 are depicted as distinct flow diagrams, these features may be used alone or in combination to detect anomalies.

The features described above allow for the detection of performance regressions each time a change is made to autonomous vehicle software. Because only CPU and memory usage are tracked for the simulations, other types of processing slowdowns, which may be unrelated to what would occur if the software was being used on a vehicle, can be ignored. In this regard, wait times for data reading, retrieving and writing for specific functions are ignored and the identification of anomalies, as discussed above, is more reliable.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of detecting performance regressions in software used to control autonomous vehicles, the method comprising:

running, by one or more processors, a first simulation using a first version of the software that controls a simulated vehicle through a driving situation;

running, by the one or more processors, a plurality of second simulations using a second version of the software that controls a simulated vehicle through the driving situation, wherein the second version of the software is different than the first version of the software;

while the first simulation is running, sampling, by the one or more processors, memory allocation for one or more functions of the first version of the software;

comparing, by the one or more processors, the sampled memory allocation for each of the one or more functions of the first version of the software during the first simulation to memory allocations for each of the one or more functions in the second version of the software during each of the plurality of second simulations; and based on the comparison, detecting, by the one or more processors, an anomaly corresponding to a performance regression in the first version of the software relating to one of the one or more functions.

2. The method of claim 1, wherein the driving situation is generated from log data collected by a vehicle operating in an autonomous driving mode.

3. The method of claim 2, further comprising selecting the driving situation based on information in the log data indicating that a computing device of the vehicle ran out of CPU.

4. The method of claim 2, further comprising selecting the driving situation based on information in the log data indicating that a computing device of the vehicle ran out of memory.

5. The method of claim 2, further comprising selecting the driving situation based on information in the log data indicating that a computing device of the vehicle ran out of processing time.

6. The method of claim 1, further comprising determining, by the one or more processors, a distribution of memory allocation for each of the one or more functions over each of the plurality of second simulations, and wherein the comparing of memory allocations is further based on the distribution of memory allocation.

7. The method of claim 6, further comprising determining, by the one or more processors, a standard deviation value for the distribution of memory allocation, and wherein the comparing of memory allocations is further based on the standard deviation value.

8. The method of claim 7, further comprising determining, by the one or more processors, a threshold value based on the standard deviation value, wherein the comparing of memory allocations is further based on the threshold value.

9. The method of claim 1, further comprising aggregating, by the one or more processors, the sampled memory allocation for one or more functions of the first version of the software among a parent function and any child functions for that parent function, and wherein the comparing of memory allocations is further based on the aggregated sampled memory allocation.

10. The method of claim 1, wherein the first version of the software includes a change relative to the second version of the software.

11. The method of claim 10, wherein the change relates to a particular type of driving situation, and wherein the method further comprises selecting the driving situation from log data generated by one or more vehicles operating in an autonomous driving mode based on the particular type of driving situation.

12. The method of claim 10, wherein the change relates to a particular type of driving situation, and wherein the method further comprises generating, by the one or more processors, the driving situation based on the particular type of driving situation.

13. The method of claim 1, further comprising, in response to detecting the anomaly, flagging, by the one or more processors, the first version of the software and the one of the one or more functions for review.

14. The method of claim 13, further comprising, before flagging the first version of the software and the one of the one or more functions for review, determining, by the one or more processors, that the anomaly has been detected in a predetermined number of runs of the first simulation.

15. A non-transitory computer-readable medium having instructions stored thereon that, when executed by one or more processors, cause the one or more processors to perform a method of detecting performance regressions in software used to control autonomous vehicles, the method comprising:
running a first simulation using a first version of the software that controls a simulated vehicle through a driving situation;
running a plurality of second simulations using a second version of the software that controls a simulated vehicle through the driving situation, wherein the second version of the software is different than the first version of the software;
while the first simulation is running, sampling memory allocation for the—one or more functions of the first version of the software;
comparing the sampled memory allocation for each of the one or more functions of the first version of the software during the first simulation to memory allocations for each of the one or more functions in the second version of the software during each of the plurality of second simulations; and
based on the comparison, detecting an anomaly corresponding to a performance regression in the first version of the software relating to one of the one or more functions.

16. The non-transitory computer-readable medium of claim 15, wherein the method further comprises, in response to detecting the anomaly, flagging the first version of the software and the one of the one or more functions for review.

17. The non-transitory computer-readable medium of claim 16, wherein the method further comprises, before flagging the first version of the software and the one of the one or more functions for review, determining that the anomaly has been detected in a predetermined number of runs of the first simulation.

18. A system for detecting performance regressions in software used to control autonomous vehicles, the system comprising:
a memory; and
one or more processors coupled to the memory and configured to:
run a first simulation using a first version of the software that controls a simulated vehicle through a driving situation;
run a plurality of second simulations using a second version of the software that controls a simulated vehicle through the driving situation, wherein the second version of the software is different than the first version of the software;
while the first simulation is running, sample memory allocation for one or more functions of the first version of the software;
compare the sampled memory allocation for each of the one or more functions of the first version of the software during the first simulation to memory allocations for each of the one or more functions in the second version of the software during each of the plurality of second simulations; and
based on the comparison, detect an anomaly corresponding to a performance regression in the first version of the software relating to one of the one or more functions.

19. The system of claim 18, wherein the one or more processors are further configured to, in response to detecting the anomaly, flag the first version of the software and the one of the one or more functions for review.

20. The system of claim 19, wherein the one or more processors are further configured to, before flagging the first version of the software and the one of the one or more functions for review, determine that the anomaly has been detected in a predetermined number of runs of the first simulation.

* * * * *